United States Patent
Iwamoto

(10) Patent No.: US 9,772,529 B2
(45) Date of Patent: Sep. 26, 2017

(54) LIQUID CRYSTAL DISPLAY

(71) Applicant: STANLEY ELECTRIC CO., LTD., Tokyo (JP)

(72) Inventor: Yoshihisa Iwamoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/228,774

(22) Filed: Aug. 4, 2016

(65) Prior Publication Data

US 2016/0342007 A1    Nov. 24, 2016

Related U.S. Application Data

(63) Continuation of application No. 13/920,792, filed on Jun. 18, 2013, now abandoned.

(30) Foreign Application Priority Data

Jun. 20, 2012 (JP) .................................. 2012-139204

(51) Int. Cl.
G02F 1/1343 (2006.01)
G02F 1/1335 (2006.01)
G02F 1/1337 (2006.01)

(52) U.S. Cl.
CPC ........ *G02F 1/13439* (2013.01); *G02F 1/1337* (2013.01); *G02F 1/133528* (2013.01);
(Continued)

(58) Field of Classification Search
CPC ........... G02F 1/13439; G02F 1/133528; G02F 1/1337; G02F 1/134336;
(Continued)

(56) References Cited

U.S. PATENT DOCUMENTS 6,816,223 B2   11/2004   Sugiyama et al.
7,199,850 B2    4/2007   Jun
(Continued)

FOREIGN PATENT DOCUMENTS

JP    2000-155317 A   6/2000
JP    2007-011251 A   1/2007
(Continued)

OTHER PUBLICATIONS

English translation of JP 2009122271 A, Title: Liquid Crystal Display Element, Author: Iwamoto Nobuhisa; Date of publication: Jun. 4, 2009, 16 pages.

*Primary Examiner* — Edward Glick
*Assistant Examiner* — Shan Liu
(74) *Attorney, Agent, or Firm* — Birch, Stewart, Kolasch & Birch, LLP

(57) ABSTRACT

A liquid crystal display includes first and second substrates; first and second electrodes provided on the first and second substrates respectively; and a liquid crystal layer provided between the first and second substrates. The first electrode includes first openings each having an elongated shape in a first direction and which are arranged with regularity, and a short side edge thereof is longer than a length between the first openings adjacent in the first direction. The second electrode includes second openings each having an elongated shape in the first direction and which are arranged with regularity, and a short side edge thereof is longer than a length between the second openings adjacent in the first direction. Each of the first and second openings has a recess in at least either of two outer edge parts along the first direction in a planar view.

1 Claim, 16 Drawing Sheets

(52) U.S. Cl.
CPC .................. *G02F 1/134336* (2013.01); *G02F 2001/133742* (2013.01); *G02F 2001/133746* (2013.01); *G02F 2001/133765* (2013.01)

(58) Field of Classification Search
CPC ........ G02F 2001/133765; G02F 2001/133742;
G02F 2001/133746; G02F 1/1343; G02F
1/134309; G02F 1/136286; G02F 1/155;
G02F 1/1393; G02F 1/1395; G02F 1/136;
G02F 1/218; G02F 1/134363; G02F
1/134327; G02F 1/133707; G02F 1/0316;
G02F 2201/12; G02F 2201/121; G02F
2201/124; G02F 2201/122; G02F
2201/123; G02F 2201/14; G02F 2202/10;
H01L 27/124; H01L 27/3276; H01L
27/3297; H01L 27/3279; H01L
2300/0421; H01L 27/0426; H01L
27/0439; H01L 23/49534; H01L
2933/0016; H01L 27/329; G09G
2300/0421; G09G 2300/0426; G09G
2300/0439; G09G 3/3659
USPC .......................................... 349/349, 139–148
See application file for complete search history.

(56) References Cited

U.S. PATENT DOCUMENTS

| | | | |
|---|---|---|---|
| 7,408,605 | B2 | 8/2008 | Kwag et al. |
| 8,031,313 | B2 | 10/2011 | Suzuki |
| 8,605,242 | B2 | 12/2013 | Cho et al. |
| 2002/0036743 | A1 | 3/2002 | Youn et al. |
| 2002/0140892 | A1* | 10/2002 | Baek ................ G02F 1/134336 349/141 |
| 2003/0071951 | A1* | 4/2003 | Jun .................... G02F 1/133707 349/129 |
| 2003/0107696 | A1* | 6/2003 | Song ................ G02F 1/133707 349/141 |
| 2004/0165136 | A1 | 8/2004 | Sugiyama et al. |
| 2004/0207790 | A1* | 10/2004 | Song ................ G02F 1/133707 349/139 |
| 2005/0128410 | A1 | 6/2005 | Lee |
| 2005/0237463 | A1* | 10/2005 | Kubo .................... G02F 1/1393 349/139 |
| 2007/0002241 | A1* | 1/2007 | Hung ................ G02F 1/133707 349/139 |
| 2008/0055528 | A1* | 3/2008 | Sasaki ............... G02F 1/133707 349/139 |
| 2008/0117374 | A1* | 5/2008 | Iwamoto ........... G02F 1/133707 349/143 |
| 2008/0273154 | A1* | 11/2008 | Song ................ G02F 1/133707 349/139 |
| 2008/0278643 | A1* | 11/2008 | Iwamoto ............... G02F 1/1337 349/36 |
| 2008/0284961 | A1* | 11/2008 | Kim .................... G02F 1/133707 349/129 |
| 2009/0047761 | A1 | 2/2009 | Yamazaki et al. |
| 2010/0149478 | A1* | 6/2010 | Lee .................... C09K 19/3003 349/144 |
| 2010/0157229 | A1* | 6/2010 | Sakurai ............. G02F 1/134363 349/141 |
| 2011/0242477 | A1 | 10/2011 | Iwamoto |
| 2012/0075561 | A1* | 3/2012 | Iwamoto ........... G02F 1/133707 349/132 |
| 2012/0147313 | A1* | 6/2012 | Kobayashi ........ G02F 1/133707 349/139 |

FOREIGN PATENT DOCUMENTS

| | | |
|---|---|---|
| JP | 4107978 B2 | 6/2008 |
| JP | 2009-122271 A | 6/2009 |

* cited by examiner

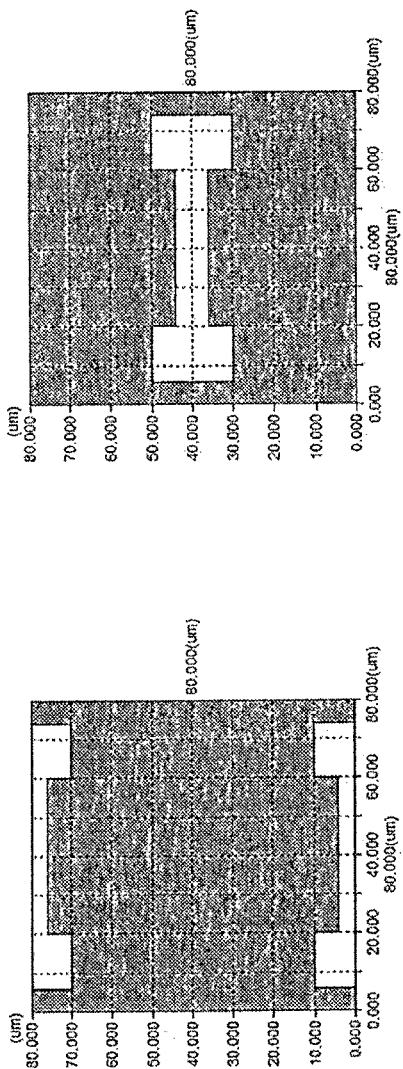
FIG. 3A
FIG. 3B
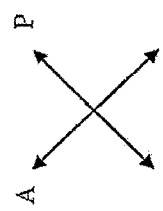
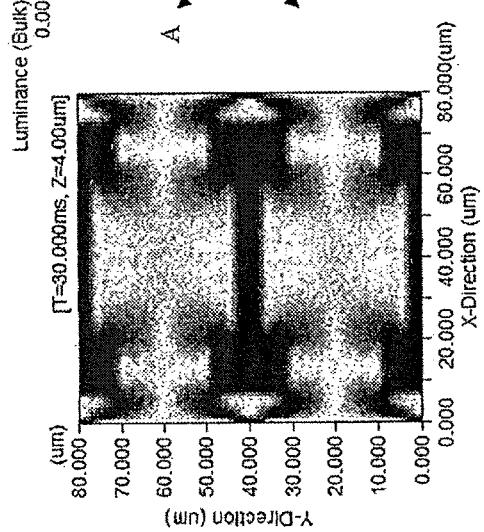
FIG. 3C

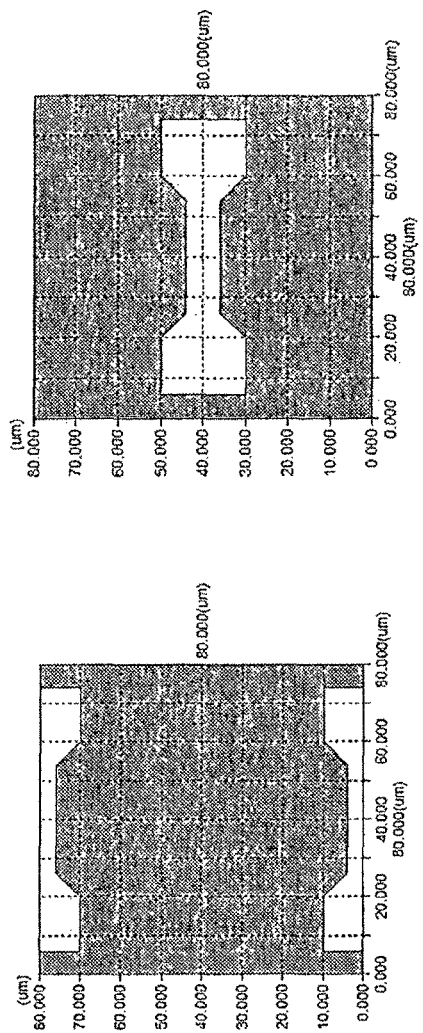
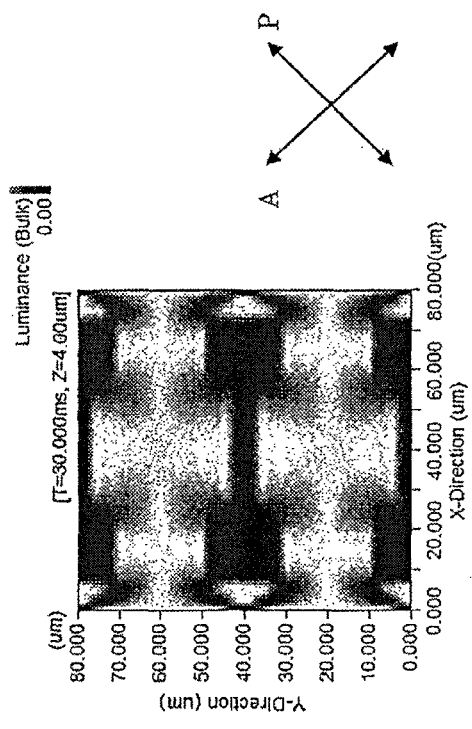
FIG. 5A
FIG. 5B
FIG. 5C

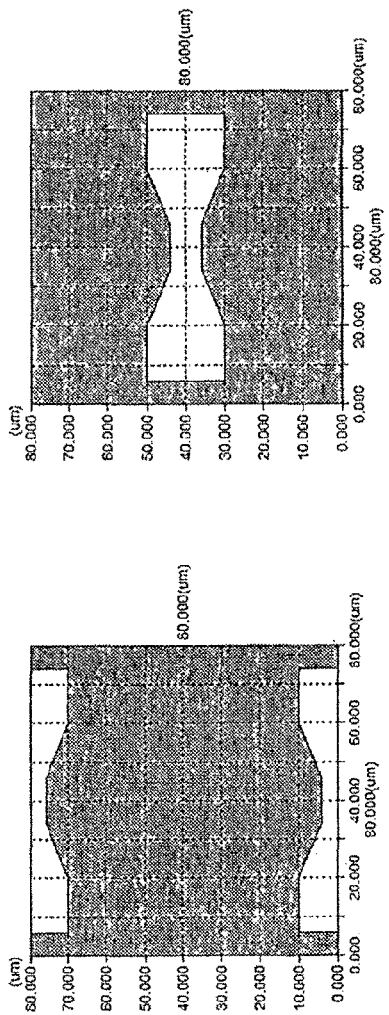
FIG. 6B
FIG. 6A
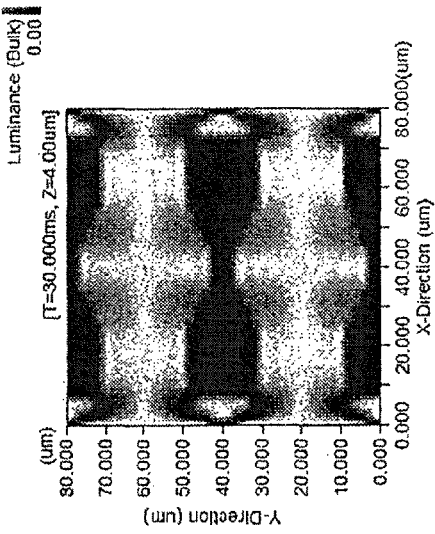
FIG. 6C

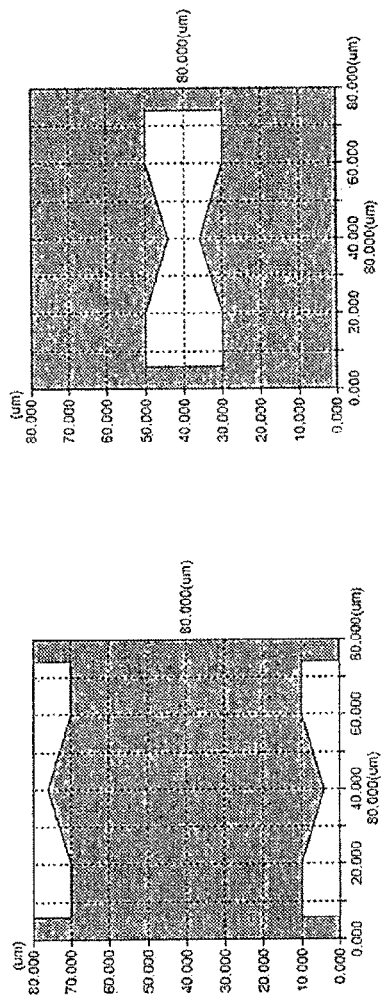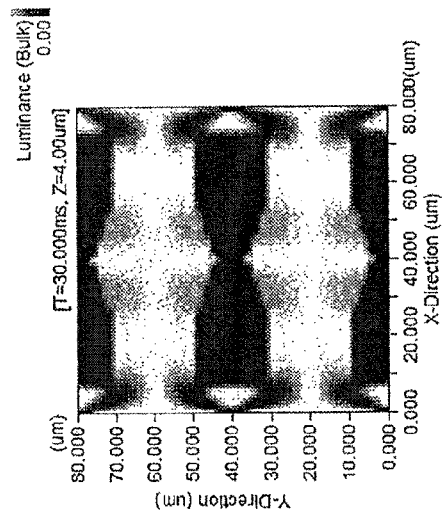
FIG. 8A
FIG. 8B
FIG. 8C

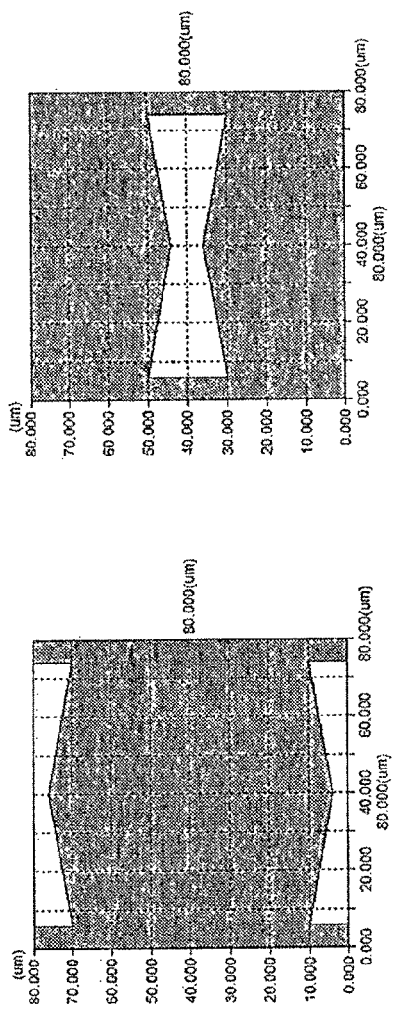
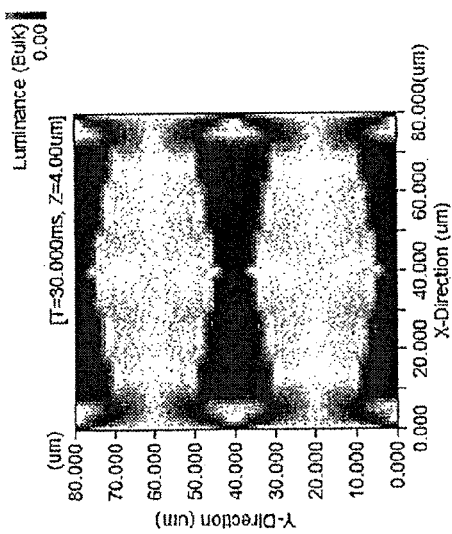
FIG. 10B
FIG. 10A
FIG. 10C

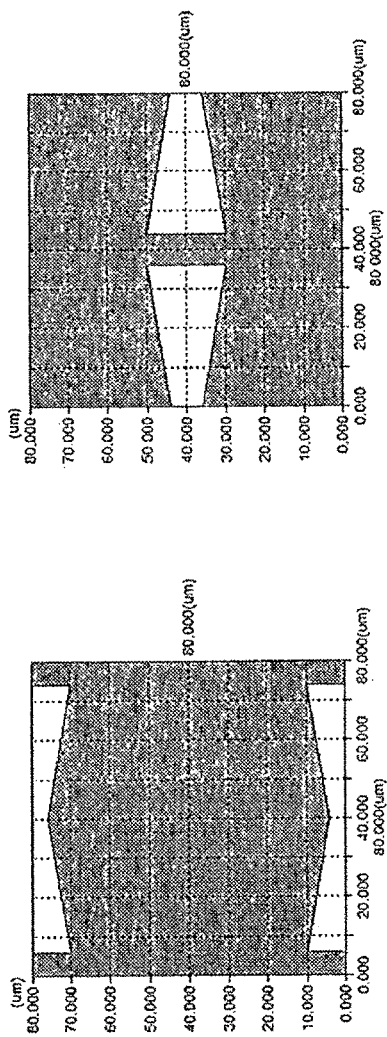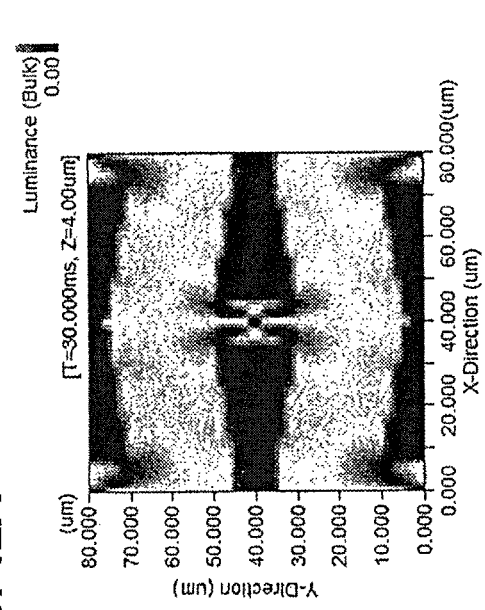
FIG. 12A
FIG. 12B
FIG. 12C

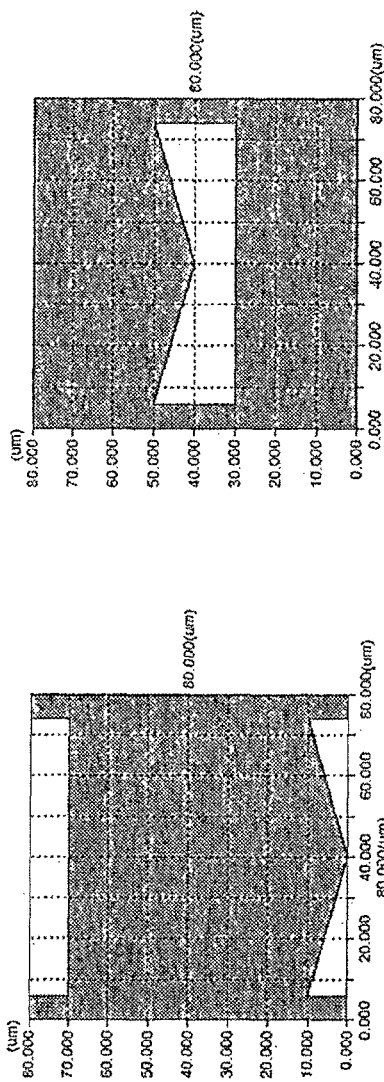
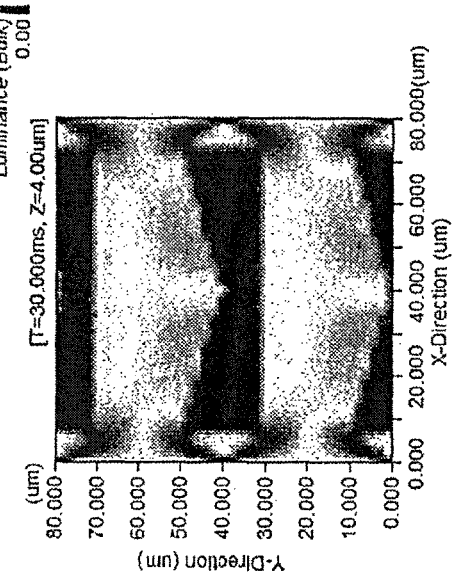
FIG. 14A
FIG. 14B
FIG. 14C

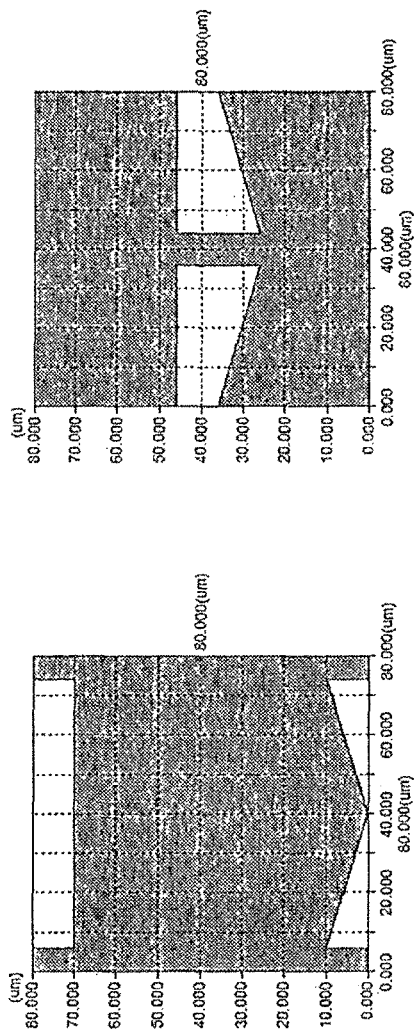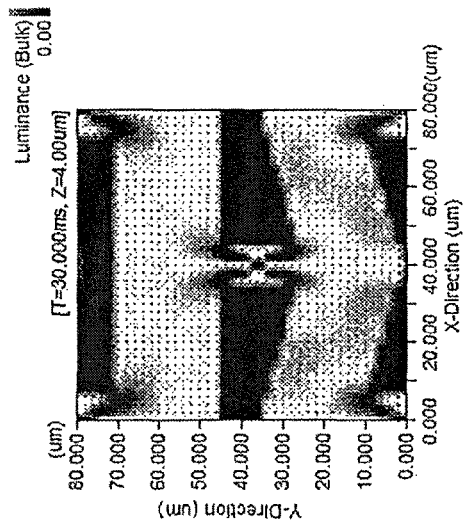

LIQUID CRYSTAL DISPLAY

CROSS-REFERENCE OF RELATED APPLICATIONS

This application is a Continuation of copending application Ser. No. 13/920,720, filed on Jun. 18, 2013, which claims priority under 35 U.S.C. §119(a) to Application No. 2012-139204, filed in Japan on Jun. 20, 2012, all of which are hereby expressly incorporated by reference into the present application.

BACKGROUND OF THE INVENTION

Field of the Invention

The present invention relates to a liquid crystal display having a plurality of openings (slits) in an electrode.

Description of the Related Art

Japanese Patent No. 4107978 (Patent Document 1) discloses a liquid crystal display in which an opening (slit) is provided to each of transparent electrodes placed opposite each other across a liquid crystal layer. With this liquid crystal display, a fringe electric field is generated in two different directions based on the effect of the slits and applied to the liquid crystal layer, whereby a two-domain alignment structure occurs in the liquid crystal layer. Consequently, the viewing angle dependency is improved, and the viewing angle dependency of the overall display area can be reduced. Moreover, JP-A-2009-122271 (Patent Document 2) discloses a liquid crystal display which aims to improve the display uniformity in a liquid crystal display provided with the foregoing slits, by causing a gap between the slits that are adjacent in the longitudinal direction to be smaller than a width (length in the short direction) of the respective slits.

Meanwhile, generally speaking, when manufacturing a liquid crystal display, a method of collectively forming a plurality of liquid crystal displays on one mother glass, and subsequently splitting the mother glass into respective liquid crystal displays is being adopted. Thus, when patterning multiple slits, variation in the etching precision tends to arise due to the in-plane position of the mother glass or differences in the production lots. Due to this kind of variation in the etching precision, there is a drawback in that the slits become joined with each other in their respective longitudinal directions, and a partial disconnection occurs in an electrode. As a solution for dealing with the foregoing drawback, considered may be lowering the etching rate by changing the etching solution or the setting of the treatment temperature. Nevertheless, lowering etching rate is undesirable since the production efficiency of the liquid crystal display will drop when the etching rate is lowered. Meanwhile, if a gap between the slits in the longitudinal direction is enlarged, the disconnection caused by the joining of the slits can be more easily prevented without having to lower the etching rate. However, as described above, in order to maintain the display uniformity of the liquid crystal display, the slit width is required to be enlarged pursuant to the enlargement of the gap between the slits in the longitudinal direction. Nonetheless, since the effective aperture ratio of a display unit of the liquid crystal display will drop as the slit width is enlarged, this measure is undesirable.

SUMMARY OF THE INVENTION

One object of a specific mode of the present invention is to provide a technique capable of preventing, while ensuring display uniformity in a liquid crystal display provided with a plurality of openings, a disconnection between the openings and additionally preventing a drop in aperture ratio.

A liquid crystal display according to one aspect of the present invention includes: (a) a first substrate and a second substrate placed opposite each other; (b) a first electrode provided on one face side of the first substrate; (c) a second electrode provided on one face side of the second substrate; and (d) a liquid crystal layer provided between one face of the first substrate and one face of the second substrate, (e) wherein the first electrode includes a plurality of first openings each having an elongated shape in a first direction and which are arranged with regularity, (f) wherein the second electrode includes a plurality of second openings each having an elongated shape in the first direction and which are arranged with regularity, and (g) wherein each of the plurality of first openings and each of the plurality of second openings have a recess in at least either of two outer edge parts along the first direction in a planar view.

According to the configuration described above, it is possible to prevent, while ensuring display uniformity in the liquid crystal display provided with the plurality of openings, a disconnection between the openings and additionally preventing a drop in aperture ratio.

Preferably, in the above-described liquid crystal display, a width of each of the plurality of first openings and a width of each of the plurality of second openings continuously decrease toward substantially center of the recess along the first direction.

Preferably, in the above-described liquid crystal display, the recess has a slope-shaped edge which intersects with the first direction at an angle that is greater than 0°. In this case, the angle with which the first direction and the slope-shaped edge intersect is preferably less than 14°.

Preferably, in the above-described liquid crystal display, each of the plurality of first openings and each of the plurality of second openings have a portion in which a relatively long length in a short direction is relatively long and a portion in which a relative short length in a short direction is relative short, and at least either the relatively long portion or the relatively short portion has an edge which is substantially parallel to the first direction.

BRIEF DESCRIPTION OF THE DRAWINGS

FIG. 3A is a diagram explaining simulation conditions of an electrode having the first openings of the constructional example 1;

FIG. 3B is a diagram explaining the simulation conditions of an electrode having the second openings of the constructional example 1;

FIG. 3C is a diagram showing simulation analysis result of alignment texture;

FIG. 5A is a diagram explaining simulation conditions of an electrode having the first openings of the constructional example 2;

FIG. 5B is a diagram explaining the simulation conditions of an electrode having the second openings of the constructional example 2;

FIG. 5C is a diagram showing simulation analysis result of alignment texture;

FIG. 6A is a diagram explaining simulation conditions (second conditions) of an electrode having the first openings of the constructional example 2;

FIG. 6B is a diagram explaining the simulation conditions (second conditions) of an electrode having the second openings of the constructional example 2;

FIG. 6C is a diagram showing simulation analysis result of alignment texture;

FIG. 8A is a diagram explaining simulation conditions of an electrode having the first openings of the constructional example 3;

FIG. 8B is a diagram explaining the simulation conditions of an electrode having the second openings of the constructional example 3;

FIG. 8C is a diagram showing simulation analysis result of alignment texture;

FIG. 10A is a diagram explaining simulation conditions of an electrode having the first openings of the constructional example 4;

FIG. 10B is a diagram explaining the simulation conditions of an electrode having the second openings of the constructional example 4;

FIG. 10C is a diagram showing simulation analysis result of alignment texture;

FIG. 12A is a diagram explaining simulation conditions of an electrode having the first openings of the constructional example 5;

FIG. 12B is a diagram explaining the simulation conditions of an electrode having the second openings of the constructional example 5;

FIG. 12C is a diagram showing simulation analysis result of alignment texture;

FIG. 14A is a diagram explaining simulation conditions of an electrode having the first openings of the constructional example 6;

FIG. 14B is a diagram explaining the simulation conditions of an electrode having the second openings of the constructional example 6;

FIG. 14C is a diagram showing simulation analysis result of alignment texture;

FIG. 16A is a diagram explaining simulation conditions of an electrode having the first openings of the constructional example 7;

FIG. 16B is a diagram explaining the simulation conditions of an electrode having the second openings of the constructional example 7;

FIG. 16C is a diagram showing simulation analysis result of alignment texture.

DESCRIPTION OF THE PREFERRED EMBODIMENTS

Embodiments of the present invention are now explained with reference to the appended drawings.

Figure 1:
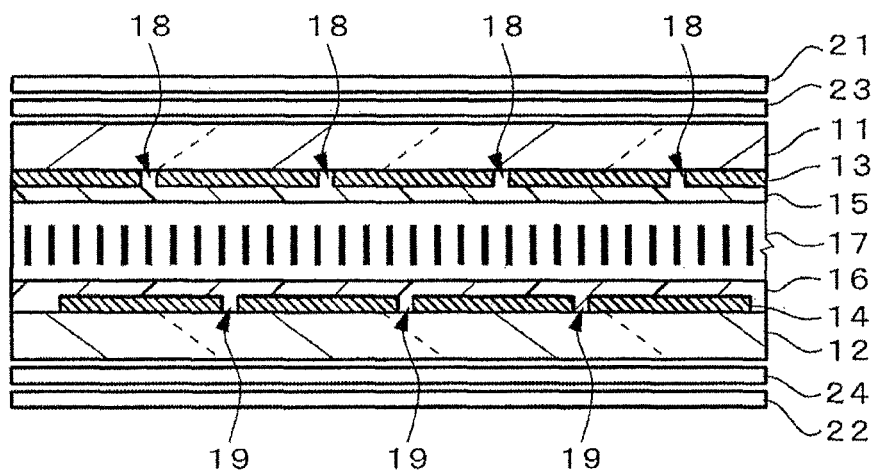
FIG. 1 is a cross section showing a basic structure of a liquid crystal display according to an embodiment.

FIG. 1 is a cross section showing a basic structure of a liquid crystal display according to an embodiment. This liquid crystal display comprises, as its basic configuration, a first substrate 11 and a second substrate 12 placed opposite each other, a first electrode 13 provided to the first substrate 11, a second electrode 14 provided to the second substrate 12, and a liquid crystal layer 17 disposed between the first substrate 11 and the second substrate 12. For example, the liquid crystal display of this embodiment is a segment display-type liquid crystal display which is configured to directly form characters and designs to be displayed by the area where the electrodes overlap each other, basically capable of only displaying predetermined characters and the like, and in which an area of about 50% or less based on an area ratio in the effective display area contributes to the display of characters and the like. Note that the liquid crystal display may also be a dot matrix display-type liquid crystal display in which a plurality of pixels are arranged in a matrix, or a combination of the segment display-type and the dot matrix display-type liquid crystal displays.

The first substrate 11 and the second substrate 12 are each, for example, a transparent substrate such as a glass substrate or a plastic substrate. As shown in the diagram, the first substrate 11 and the second substrate 12 are bonded together with a predetermined gap (for instance, about 4 μm) provided therebetween.

The first electrode 13 is provided to one face side of the first substrate 11. Similarly, the second electrode 14 is provided to one face side of the second substrate 12. The first electrode 13 and the second electrode 14 are each configured by suitably patterning a transparent conductive film made from indium tin oxide (ITO) or the like. The first electrode 13 is provided with a plurality of first openings (first slits) 18, and the second electrode 14 is provided with a plurality of second openings (second slits) 19. Each of the first openings 18 and each of the second openings 19 have an elongated shape in one direction, and are arranged with regularity so that, in a planar view, they do not overlap with each other and are alternated.

A first alignment film 15 is provided to one face side of the first substrate 11 so as to cover the first electrode 13. A second alignment film 16 is provided to one face side of the second substrate 12 so as to cover the second electrode 14. As the foregoing first alignment film 15 and second alignment film 16, used is a vertical alignment film for regulating the state of alignment of the liquid crystal layer 17 to be a vertical alignment. The respective alignment films are not subject to uniaxial alignment treatment such as rubbing treatment.

The liquid crystal layer 17 is provided between the first substrate 11 and the second substrate 12. In this embodiment, the liquid crystal layer 17 is configured using a liquid crystal material having a negative dielectric anisotropy $\Delta\epsilon$. The refractive index anisotropy $\Delta n$ of the liquid crystal material is, for example, about 0.09. The bold lines illustrated in the liquid crystal layer 17 schematically show the alignment direction of the liquid crystal molecules in the liquid crystal layer 17. With the liquid crystal layer 17 of this embodiment, the alignment direction of the liquid crystal molecules during the non-application of voltage is set to be a vertical alignment which is perpendicular to each substrate face of the first substrate 11 and the second substrate 12.

A first polarizer 21 is disposed on the outside of the first substrate 11. Similarly, a second polarizer 22 is disposed on the outside of the second substrate 12. The first polarizer 21 and the second polarizer 22 are disposed so that their respective absorption axes are substantially orthogonal to each other. Moreover, an optical compensator such as a C plate may be disposed between the respective polarizers and the respective substrates as needed. For example, in this embodiment, optical compensators 23, 24 are respectively disposed between the first substrate 11 and the first polarizer 21, and between the second substrate 12 and the second polarizer 22.

Several constructional examples of the first openings 18 and the second openings 19 and the results of three-dimensional simulation analysis to the alignment texture in a normal state of the liquid crystal display adopting such constructional examples after voltage application are now explained. Note that the conditions of simulation analysis were as follows. Assuming an area of an 80 μm square, this area was divided into 20×20 mesh in a planar view, and the layer thickness direction of the liquid crystal layer was divided into 20 sections. The liquid crystal layer was a complete vertical alignment in which the pre-tilt angle during the non-application of voltage is 90°, and the layer thickness thereof was set to 4 μm. Regarding the liquid crystal material, the dielectric anisotropy was set to negative and the refractive index anisotropy (Δn) was set to substantially 0.09. The application voltage was set so that a voltage of 4 V is applied to the first electrode (segment electrode) and a voltage of 0 V is applied to the second electrode (common electrode). Regarding the polarizers, the absorption axis direction of the first polarizer was set to a direction rotated 45° clockwise relative to the respective longitudinal directions of the first openings and the second openings, and the absorption axis direction of the second polarizer was set to a direction rotated 45° counterclockwise relative to the respective longitudinal directions of the first openings and the second openings Constructional Example 1

Figure 2:
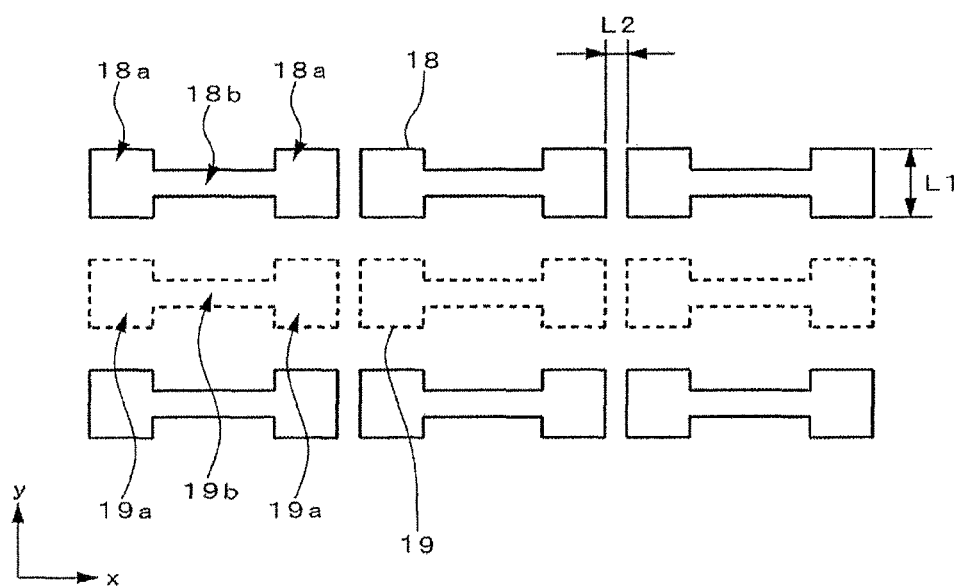
FIG. 2 is a plan view of first openings and second openings of a constructional example 1.

FIG. 2 is a plan view of the first openings and the second openings of a constructional example 1. The respective first openings 18 and second openings 19 are disposed such that their respective longitudinal directions are along the illustrated x direction (first direction), and their respective short directions are along the illustrated y direction (second direction). The respective first openings 18 and second openings 19 are arranged with regularity by forming a column in the x direction, and forming a row in the y direction. Moreover, the respective first openings 18 and second openings 19 are disposed one after the other (alternately) along the y direction.

Each first opening 18 has portions 18a having a relatively large slit width (length in the short direction) at respective one end side and another end side, along the longitudinal direction, and a portion 18b having a relatively small slit width between the two portions 18a. Each of these portions 18a, 18b is formed in a substantially rectangular shape, and each of portions has an edge that is substantially parallel to the x direction. In other words, each first opening 18 has a substantially rectangular depression (recess) in a planar view at the outer edge part near the center in the longitudinal direction. In addition, a width L1 of the portions 18a having a relatively large slit width is set to be longer than a length L2 between the first openings 18 that are adjacent in the longitudinal direction (that is, set to L1>L2). Note that each second opening 19 also comprises portions 19a, 19b as with each of the first openings 18.

FIG. 3A is a diagram explaining the simulation conditions of the electrode having the first openings of the constructional example 1. FIG. 3B is a diagram explaining the simulation conditions of the electrode having the second openings of the constructional example 1. As shown in FIG. 3A and FIG. 3B, with the respective first openings and second openings, the width of the portions having a relative large slit width is set to substantially 20 μm, the length in the x direction of the portions having a relatively large slit width is set to substantially 15 μm, the length in the x direction of the portion having a relatively small slit width is set to substantially 40 μm, and the width of the portion having a relatively small slit width is set to substantially 10 μm. Moreover, with respect to the length between the first opening and the second opening that are adjacent in the short direction in a planar view, the gap between the portions having a relatively large slit width is set to substantially 20 μm, and the gap between the portions having a relatively small slit width is set to substantially 30 μm.

FIG. 3C is a diagram showing the simulation analysis result of the alignment texture. The illustrated arrows of "A" and "P" respectively indicate the direction of the respective absorption axes of the first polarizer and the second polarizer (hereinafter the same). In an area that is sandwiched by the portions having a relatively small slit width in each of the first openings and second openings, the state of alignment yielded a favorable multi-domain alignment as intended, and the alignment uniformity was favorable. Nevertheless, a dark region occurred near the stepped part where the slit width changes from the width in the relatively small portion to the width in the relatively large portion (location where the slit width changes from 20 μm to 10 μm), and there is some concern that the effective aperture ratio may drop. Note that, although not illustrated, when the transient response was observed, the area sandwiched by the portions having a relatively large slit width in each of the first openings and second openings tended to show a faster response speed, and it was found that this yields an effect of improving the overall rise response speed. This is considered to be a result of the gap in the respective short directions between the first opening and the second opening becoming even shorter.

Constructional Example 2

Figure 4:
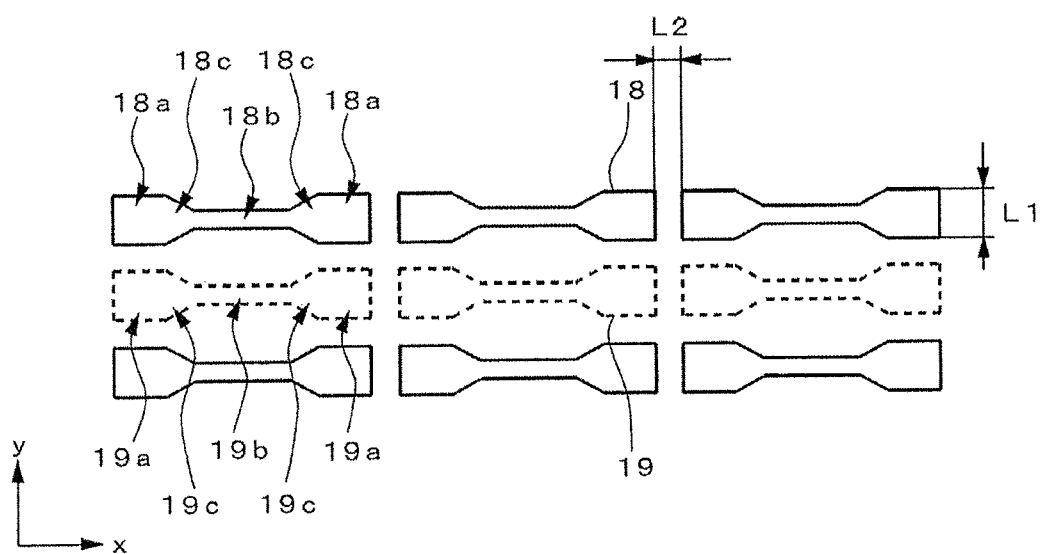
FIG. 4 is a plan view of first openings and second openings of a constructional example 2.

FIG. 4 is a plan view of the first openings and the second openings of a constructional example 2. The respective first openings 18 and second openings 19 are disposed such that their respective longitudinal directions are along the illustrated x direction, and their respective short directions are along the illustrated y direction. The respective first openings 18 and second openings 19 are arranged with regularity by forming a column in the x direction, and forming a row in the y direction. Moreover, the respective first openings 18 and second openings 19 are disposed one after the other (alternately) along the y direction.

Each first opening 18 has portions 18a having a relatively large slit width at respective one end side and another end side, along the longitudinal direction, a portion 18b having a relatively small slit width between the two portions 18a, and slope-shaped portions 18c which are disposed between and connects each portion 18a and the portion 18b. With each of the slope-shaped portions 18c, the slit width continuously decreases from the portion 18a toward the portion 18b. In other words, each first opening 18 has a substantially trapezoidal depression (recess) in a planar view at the outer edge part around the center in the longitudinal direction. In addition, a width L1 of the portions 18a having a relatively large slit width is set to be longer than a length L2 between the first openings 18 that are adjacent in the longitudinal direction (that is, set to L1>L2). Note that each second opening 19 also comprises portions 19a, 19b, and 19c as with each of the first openings 18.

FIG. 5A is a diagram explaining the simulation conditions of the electrode having the first openings of the constructional example 2. FIG. 5B is a diagram explaining the simulation conditions of the electrode having the second openings of the constructional example 2. As shown in FIG. 5A and FIG. 5B, with the respective first openings and second openings, the width of the portions having a relative large slit width is set to substantially 20 μm, the length in the longitudinal direction of the portions having a relatively large slit width is set to substantially 15 μm, the width of the portion having a relatively small slit width is set to substantially 10 μm, the length in the longitudinal direction of the portion having a relatively small slit width is set to substantially 30 μm, and the length in the longitudinal direction of the slope-shaped portions is set to substantially 5 μm, respectively. Moreover, with respect to the length between the first opening and the second opening that are adjacent in the short direction in a planar view, the gap between the portions having a relatively large slit width is set to substantially 20 μm, and the gap between the portions having a relatively small slit width is set to substantially 30 μm. Moreover, the angle formed by the edge direction of the slope-shaped portion and the longitudinal direction of the respective first openings and second openings is substantially 45°.

FIG. 5C is a diagram showing the simulation analysis result of the alignment texture. In an area that is sandwiched by the portions having a relatively small slit width in each of the first openings and second openings, the state of alignment yielded a favorable multi-domain alignment as intended, and the alignment uniformity is favorable. Nevertheless, since the edge direction of the slope-shaped portion, which is a midway where the slit width changes from the width in the relatively small portion to the width in the relatively large portion, was defined to be substantially parallel or substantially orthogonal to the absorption axis of the respective polarizers, the dark region that arose in the vicinity of the slope-shaped portion was observed as a larger area than the case of the constructional example 1. Therefore, there is concern that the effective aperture ratio will drop. Thus, in the constructional example 2, a case of changing the tilt angle of the edge of the slope-shaped portion was additionally examined.

FIG. 6A is a diagram explaining the simulation conditions (second conditions) of the electrode having the first openings of the constructional example 2. FIG. 6B is a diagram explaining the simulation conditions (second conditions) of the electrode having the second openings of the constructional example 2. As shown in FIG. 6A and FIG. 6B, with the respective first openings and second openings, the width of the portions having a relative large slit width is set to substantially 20 μm, the length in the longitudinal direction of the portions having a relatively large slit width is set to substantially 15 μm, the width of the portion having a relatively small slit width is set to substantially 10 μm, the length in the longitudinal direction of the portion having a relatively small slit width is set to substantially 30 μm, and the length in the longitudinal direction of the slope-shaped portions is set to substantially 10 μm, respectively. Moreover, with respect to the gap between the first opening and the second opening that are adjacent in the short direction in a planar view, the gap between the portions having a relatively large slit width is set to substantially 20 μm, and the gap between the portions having a relatively small slit width is set to substantially 30 μm. Moreover, the slope-shaped portion linearly connects the portion having a relatively small slit width and the portion having a relatively large slit width, and the tilt angle of the edge (angle formed with the longitudinal direction) is substantially 18°. FIG. 6C is a diagram showing the simulation analysis result of the alignment texture. In comparison to the alignment texture shown in FIG. 5C, it can be seen that the density of the dark region arising near the slope-shaped portion has weakened.

Constructional Example 3

Figure 7:
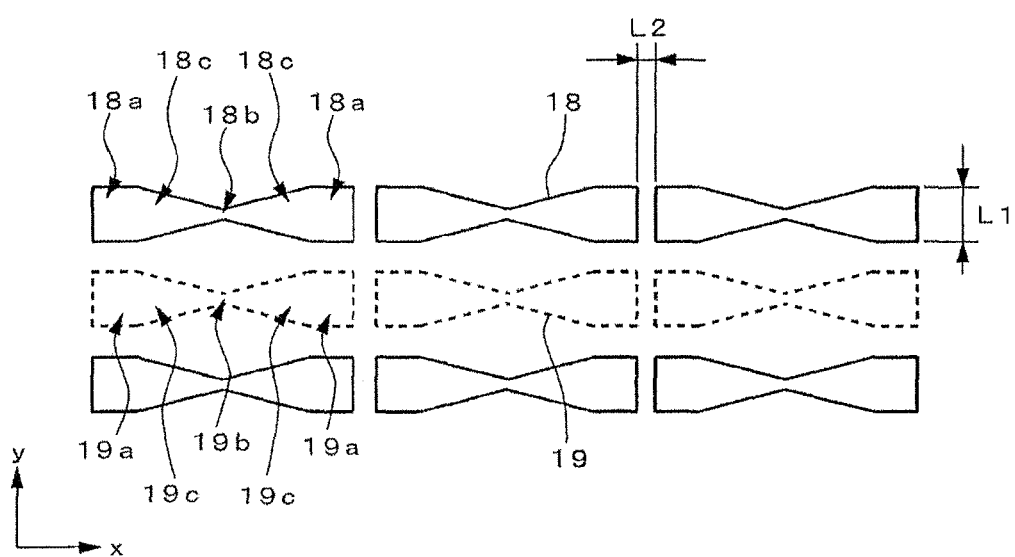
FIG. 7 is a plan view of first openings and second openings of a constructional example 3.

FIG. 7 is a plan view of the first openings and the second openings of a constructional example 3. The respective first openings 18 and second openings 19 are disposed such that their respective longitudinal directions are along the illustrated x direction, and their respective short directions are along the illustrated y direction. The respective first openings 18 and second openings 19 are arranged with regularity by forming a column in the x direction, and forming a row in the y direction. Moreover, the respective first openings 18 and second openings 19 are disposed one after the other (alternately) along the y direction.

Each first opening 18 has portions 18a having a relatively large slit width at respective one end side and another end side, along the longitudinal direction, a portion 18b having a relatively small slit width between the two portions 18a, and slope-shaped portions 18c which are disposed between and connects each portion 18a and the portion 18b. In the constructional example 3, the length in the longitudinal direction of the portion 18b having a relatively small slit width is 0, and with each of the slope-shaped portions 18c, the slit width continuously decreases from the portion 18a toward the portion 18b. In other words, each first opening 18 has a substantially V-shaped depression (recess) in a planar view at the outer edge part around the center in the longitudinal direction. With the constructional example 3, since the length in the longitudinal direction of the portion 18b having a relatively small slit width is 0, the constructional example 3 differs from the constructional example 2 with respect to the point that the recess has no portion which is substantially parallel to the longitudinal direction of the first opening 18. In addition, a width L1 of the portions 18a having a relatively large slit width is set to be longer than a length L2 between the first openings 18 that are adjacent in the longitudinal direction (that is, set to L1>L2). Note that each second opening 19 also comprises portions 19a, 19b, and 19c as with each of the first openings 18.

FIG. 8A is a diagram explaining the simulation conditions of the electrode having the first openings of the constructional example 3. FIG. 8B is a diagram explaining the simulation conditions of the electrode having the second openings of the constructional example 3. As shown in FIG. 8A and FIG. 8B, with the respective first openings and second openings, the width of the portions having a relative large slit width is set to substantially 20 μm, the length in the longitudinal direction of the portions having a relatively large slit width is set to substantially 15 μm, the width of the portion having a relatively small slit width is set to substantially 10 μm, and the length in the longitudinal direction of the slope-shaped portions is set to substantially 40 μm, respectively. Moreover, with respect to the gap between the first opening and the second opening that are adjacent in the short direction in a planar view, the gap between the portions having a relatively large slit width is set to substantially 20 μm, and the gap between the portions having a relatively small slit width is set to substantially 30 μm. Moreover, the angle formed by the edge direction of the slope-shaped portion and the longitudinal direction of the respective first openings and second openings is substantially 14°. FIG. 8C is a diagram showing the simulation analysis result of the alignment texture. While a dark region can be observed slightly near the slope-shaped portion, it can be seen that the dark region is lighter in comparison to the case of the constructional example 2.

Constructional Example 4

Figure 9:
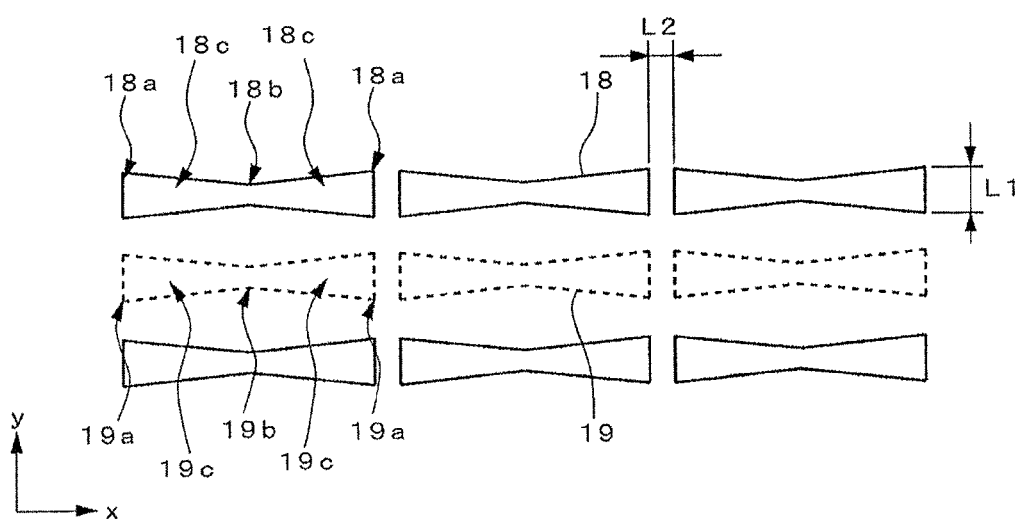
FIG. 9 is a plan view of first openings and second openings of a constructional example 4.

FIG. 9 is a plan view of the first openings and the second openings of a constructional example 4. The respective first openings 18 and second openings 19 are disposed such that their respective longitudinal directions are along the illustrated x direction, and their respective short directions are along the illustrated y direction. The respective first openings 18 and second openings 19 are arranged with regularity by forming a column in the x direction, and forming a row in the y direction. Moreover, the respective first openings 18 and second openings 19 are disposed one after the other (alternately) along the y direction.

Each first opening 18 has portions 18a having a relatively large slit width at respective one end side and another end side, along the longitudinal direction, a portion 18b having a relatively small slit width between the two portions 18a, and slope-shaped portions 18c which connects the respective portions 18a and portions 18b. In the constructional example 4, respective length in the longitudinal direction of the portions 18a having a relatively large slit width and length in the longitudinal direction of the portion 18b having a relatively small slit width are 0, and with each of the slope-shaped portions 18c, the slit width continuously decreases from the portion 18a toward the portion 18b. In other words, each first opening 18 has a substantially V-shaped depression (recess) in a planar view at the outer edge part around the center in the longitudinal direction. With the constructional example 4, since the lengths in the longitudinal direction of the portion 18a having a relatively large slit width and the portion 18b having a relatively small slit width are both 0, the constructional example 4 differs from the constructional example 3 with respect to the point that the recess has no portion which is substantially parallel to the longitudinal direction of the first opening 18. In addition, a width L1 of the portions 18a having a relatively large slit width is set to be longer than a length L2 between the first openings 18 that are adjacent in the longitudinal direction (that is, set to L1>L2). Note that each second opening 19 also comprises portions 19a, 19b, and 19c as with each of the first openings 18.

FIG. 10A is a diagram explaining the simulation conditions of the electrode having the first openings of the constructional example 4. FIG. 10B is a diagram explaining the simulation conditions of the electrode having the second openings of the constructional example 4. As shown in FIG. 10A and FIG. 10B, with the respective first openings and second openings, the width of the portions having a relative large slit width (length of short side edge) is set to substantially 20 μm, the width of the portion having a relatively small slit width is set to substantially 10 μm, and the length in the longitudinal direction of the slope-shaped portions is set to substantially 70 μm, respectively. Moreover, with respect to the gap between the first opening and the second opening that are adjacent in the short direction in a planar view, the gap between the portions having a relatively large slit width is set to substantially 20 μm, and the gap between the portions having a relatively small slit width is set to substantially 30 μm. Moreover, the angle formed by the edge direction of the slope-shaped portion and the longitudinal direction of the respective first openings and second openings is substantially 8°. FIG. 10C is a diagram showing the simulation analysis result of the alignment texture. A dark region can hardly be observed near the slope-shaped portion, and the state of alignment in the area sandwiched by the first opening and the second opening is extremely uniform, and a highly effective aperture ratio can be obtained.

As a result of more detailed analysis based on the foregoing analysis results, it has been confirmed that, in a constructional example in which the respective openings have slope-shaped portions around the center in the longitudinal direction thereof, the angle formed by the edge direction of the slope-shaped portion and the longitudinal direction of the respective openings is preferably less than 14°, and more preferably 8° or below. If these conditions are satisfied, in all cases of using one among the constructional examples 2 to 4, it is possible to obtain a favorable alignment texture having a highly effective aperture ratio, and a uniform display state also in terms of appearance.

Constructional Example 5

Figure 11:
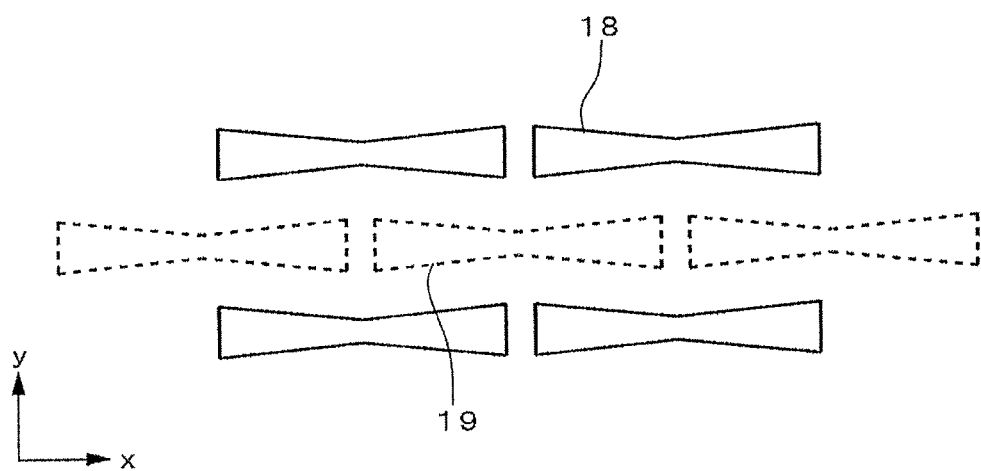
FIG. 11 is a plan view of first openings and second openings of a constructional example 5.

FIG. 11 is a plan view of the first openings and the second openings of a constructional example 5. The respective first openings 18 and second openings 19 are disposed such that their respective longitudinal directions are along the illustrated x direction, and their respective short directions are along the illustrated y direction. The respective first openings 18 and second openings 19 are arranged with regularity by forming a column in the x direction, and forming a row in the y direction. Moreover, the respective first openings 18 and second openings 19 are disposed one after the other (alternately) along the y direction. Moreover, the respective first openings 18 and second openings 19 are disposed such that their positions in the x direction are displaced by half a pitch. Incidentally, since the detailed structure of the respective first openings 18 and second openings 19 is substantially the same as the constructional example 4 described above, the explanation thereof is omitted. In the case of the constructional example 5, the gap between the respective edges of the first opening 18 and the second opening 19 that are adjacent in the y direction is constant at all positions.

FIG. 12A is a diagram explaining the simulation conditions of the electrode having the first openings of the constructional example 5. FIG. 12B is a diagram explaining the simulation conditions of the electrode having the second openings of the constructional example 5. As shown in FIG. 12A and FIG. 12B, with the respective first openings and second openings, the width of the portions having a relative large slit width (length of short side edge) is set to substantially 20 μm, the width of the portion having a relatively small slit width is set to substantially 10 μm, and the length in the longitudinal direction of the slope-shaped portions is set to substantially 70 μm, respectively. Moreover, the gap between the first opening and the second opening that are adjacent in the short direction in a planar view is set to substantially 30 pm at all positions. Moreover, the angle formed by the edge direction of the slope-shaped portion and the longitudinal direction of the respective first openings and second openings is substantially 8°. Moreover, as with the gap between the first openings 18 that are adjacent in the longitudinal direction, the respective gaps between the adjacent second openings 19 is set to substantially 10 μm. FIG. 12C is a diagram showing the simulation analysis result of the alignment texture. A dark region can hardly be observed near the slope-shaped portion, and the state of alignment in the area sandwiched by the first opening and the second opening is extremely uniform, an effective aperture ratio that is even higher than constructional example 4 can be obtained.

Constructional Example 6

In the constructional examples 1 to 5 described above, the respective first openings 18 and second openings 19 have recesses on both side in the longitudinal direction at outer edge parts in a planar view, but the recess may only exist on one side. The ensuing explanation illustrates a case where the respective first openings 18 and second openings 19 of the constructional example 4 are modified so that the recess exists only on one side, and the same applies to the other constructional examples.

Figure 13:
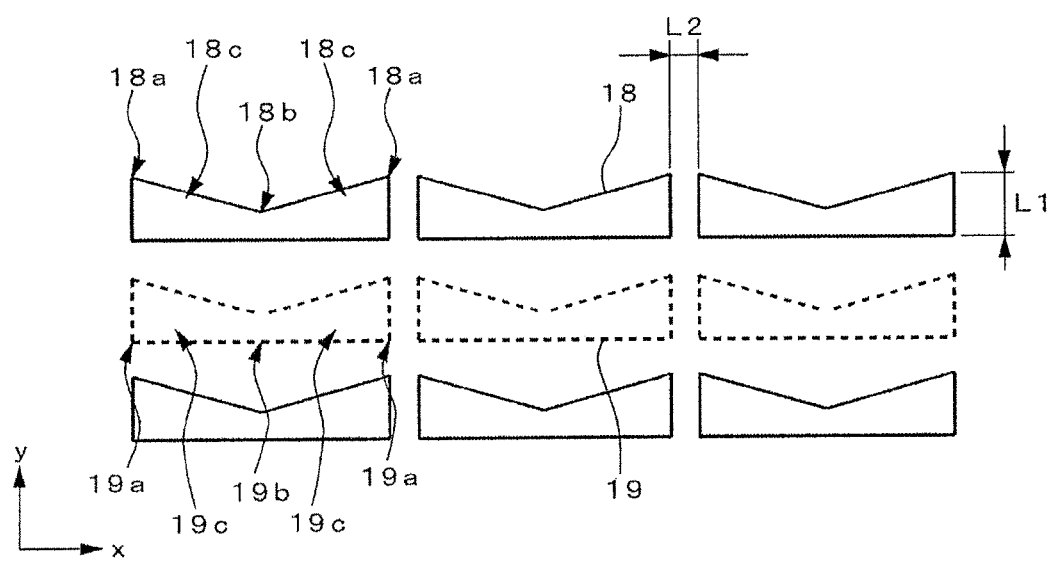
FIG. 13 is a plan view of first openings and second openings of a constructional example 6.

FIG. 13 is a plan view of the first openings and the second openings of a constructional example 6. The respective first openings 18 and second openings 19 are disposed such that their respective longitudinal directions are along the illustrated x direction, and their respective short directions are along the illustrated y direction. The respective first openings 18 and second openings 19 are arranged with regularity by forming a column in the x direction, and forming a row in the y direction. Moreover, the respective first openings 18 and second openings 19 are disposed one after the other (alternately) along the y direction.

Each first opening 18 has portions 18a having a relatively large slit width at respective one end side and another end side, along the longitudinal direction, a portion 18b having a relatively small slit width between the two portions 18a, and one-sided slope-shaped portions 18c which are disposed between and connects each portion 18a and the portion 18b. In the constructional example 6, respective length in the longitudinal direction of the portions 18a having a relatively large slit width and length in the longitudinal direction of the portion 18b having a relatively small slit width are 0, and with each of the slope-shaped portions 18c, the slit width continuously decreases from the portion 18a toward the portion 18b. Each first opening 18 has a substantially V-shaped depression (recess) in a planar view at one outer edge part around the center in the longitudinal direction. The other outer edge part of each first opening 18 is formed in a linear shape that is substantially parallel to the first direction. In the constructional example 6, the recess has no portion which is substantially parallel to the longitudinal direction of the first opening 18. Note that each second opening 19 also comprises portions 19a, 19b, and 19c as with each of the first openings 18.

FIG. 14A is a diagram explaining the simulation conditions of the electrode having the first openings of the constructional example 6. FIG. 14B is a diagram explaining the simulation conditions of the electrode having the second openings of the constructional example 6. As shown in FIG. 14A and FIG. 14B, with the respective first openings and second openings, the width of the portions having a relative large slit width (length of short side edge) is set to substantially 20 μm, the width of the portion having a relatively small slit width is set to substantially 10 μm, and the length in the longitudinal direction of the slope-shaped portions is set to substantially 70 μm, respectively. Moreover, with respect to the gap between the first opening and the second opening that are adjacent in the short direction in a planar view, the gap near the short side edge which becomes the shortest is set to substantially 20 μm, and the gap at the position in which the slit width becomes smallest is set to substantially 30 μm. Moreover, the angle formed by the edge direction of the slope-shaped portion and the longitudinal direction of the respective first openings and second openings is substantially 16°. Moreover, as with the gaps between the first openings 18 that are adjacent in the longitudinal direction, the respective gaps between the adjacent second openings 19 is set to substantially 10 μm. FIG. 14C is a diagram showing the simulation analysis result of the alignment texture. While a dark region can be slightly observed near the slope-shaped portion, since the edges of the outer edge parts of the openings that are adjacent and face each other in the short direction are substantially parallel, extending the dark region to the surrounding areas is not observed, and a uniform display can be obtained.

Constructional Example 7

In a case as with the constructional example 6 described above where each of the first openings 18 and second openings 19 have a recess only on one side in the longitudinal direction, the respective first openings 18 and second openings 19 may be disposed such that their positions in the x direction are displaced by half a pitch. Moreover, the positions where the recess is provided in the respective first openings 18 and second opening 19 may differ.

Figure 15:
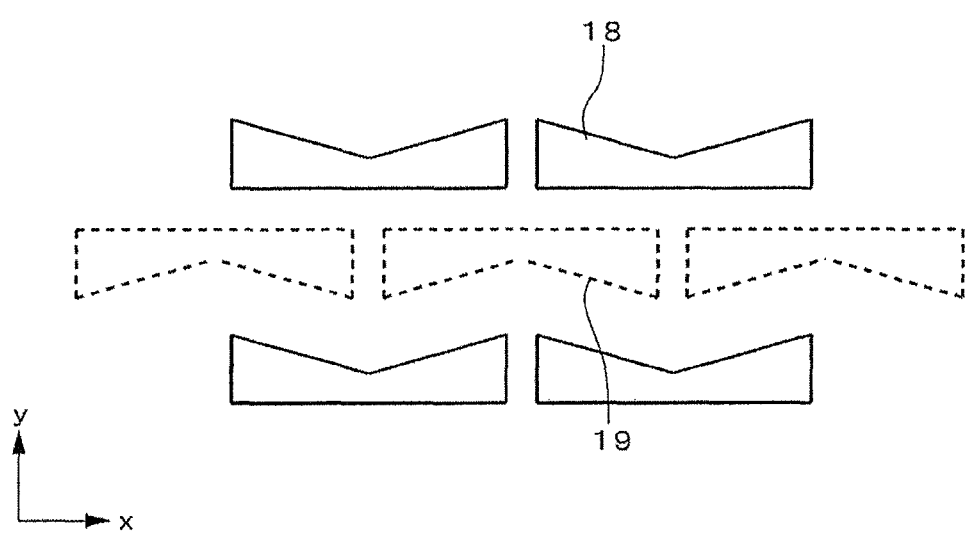
FIG. 15 is a plan view of first openings and second openings of a constructional example 7.
Figure 17A:
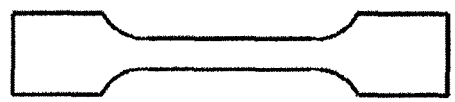
FIG. 17A to FIG. 17D are plan views of first openings and second openings of respective other constructional examples.
Figure 17B:
Figure 17C:
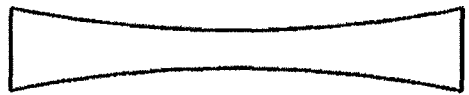
Figure 17D:

FIG. 15 is a plan view of the first openings and the second openings of a constructional example 7. The respective first openings 18 and second openings 19 are disposed such that their respective longitudinal directions are along the illustrated x direction, and their respective short directions are along the illustrated y direction. The respective first openings 18 and second openings 19 are arranged with regularity by forming a column in the x direction, and forming a row in the y direction. Moreover, the respective first openings 18 and second openings 19 are disposed one after the other (alternately) along the y direction, and disposed such that their positions in the x direction are displaced by half a pitch. The detailed structure of the respective first openings 18 and second openings 19 is substantially the same as the constructional example 6 described above, and the respective first openings 18 and second openings are disposed such that their respective sides having the recess face each other, and the sides that do not have the recess face each other. In the case of the constructional example 7 , the gap between the respective edges of the first opening 18 and the second opening 19 that are adjacent in the y direction is constant at all positions.

FIG. 16A is a diagram explaining the simulation conditions of the electrode having the first openings of the constructional example 7. FIG. 16B is a diagram explaining the simulation conditions of the electrode having the second openings of the constructional example 7. As shown in FIG. 16A and FIG. 16B, with the respective first openings and second openings, the width of the portions having a relative large slit width (length of short side edge) is set to substantially 20 μm, the width of the portion having a relatively small slit width is set to substantially 10 μm, and the length in the longitudinal direction of the slope-shaped portions is set to substantially 70 μm, respectively. Moreover, the gap between the first opening and the second opening that are adjacent in the short direction in a planar view is set to substantially 30 μm at all positions. Moreover, the angle formed by the edge direction of the slope-shaped portion and the longitudinal direction of the respective first openings and second openings is substantially 16°. Moreover, as with the gaps between the first openings 18 that are adjacent in the longitudinal direction, the respective gaps between the adjacent second openings 19 is set to substantially 10 µm. FIG. 16C is a diagram showing the simulation analysis result of the alignment texture. While a dark region can be observed slightly near the slope-shaped portion, a favorable and uniform alignment is obtained near the edge that is parallel to the longitudinal direction of the respective openings.

In each of the constructional examples 6 and 7 described above, if the angle formed by the edge direction of the slope-shaped portion and the longitudinal direction of the respective openings is set to be less than 14°, and more preferably 8° or below, it is possible to inhibit the generation of dark regions and further improve the effective aperture ratio.

Note that the present invention is not limited to the foregoing embodiments, and may be variously modified and worked within the scope of gist of the present invention. For example, in foregoing constructional examples 2 to 7, while the edges of the slope-shaped portions of the respective first openings and the respective second openings is linear, such edges do not necessarily have to be linear, and may be a curve as illustrated in FIG. 17A to FIG. 17D, or a line of flexure obtained by connecting a plurality of line segments.

Moreover, while the foregoing embodiments explained a liquid crystal display which uses a vertically aligned liquid crystal layer, the configuration is not limited thereto. The present invention can also be applied to a liquid crystal display which uses a liquid crystal layer in which the liquid crystal molecules are aligned horizontally on the substrate face, the alignment direction of the liquid crystal molecules at substantially center of the liquid crystal layer in the layer thickness direction is substantially orthogonal to the longitudinal direction of the respective openings, and the pre-tilt angle, during the non-application of voltage, of the liquid crystal molecules at substantially center of the liquid crystal layer in the layer thickness direction is substantially 0°.

What is claimed is:

1. A liquid crystal display, comprising:
   a first substrate and a second substrate placed opposite each other;
   a first electrode provided on one face side of the first substrate;
   a second electrode provided on one face side of the second substrate; and
   a liquid crystal layer provided between one face of the first substrate and one face of the second substrate, wherein:
   the first electrode includes a plurality of first openings each having an elongated shape in a first direction, the plurality of first openings being arranged along the first direction and arranged separate from one another with regularity,
   the second electrode includes a plurality of second openings each having an elongated shape in the first direction, the plurality of second openings being arranged along the first direction and arranged separate from one another with regularity,
   each of the plurality of first openings and each of the plurality of second openings have a recess at a substantially center in the first direction of at least one of two long sides along the first direction in a planar view, and
   for each of the plurality of first openings and plurality of second openings:
      at least one of the two long sides of the respective opening consists of two straight lines connected at a point to become a polygonal line, and has no portion that is parallel with the first direction,
      the point where the two straight lines meet corresponds to the recess,
      a width of short sides of the respective opening which are located at both ends of the respective opening, measured in a second direction which is orthogonal to the first direction, is larger than a length between two immediate adjacent openings measured in the first direction,
      a width of the respective opening measured in the second direction continuously decreases toward the substantially center of the respective recess along the first direction, and
      the recess has a slope-shaped edge which intersects with the first direction at an angle that is greater than 0° and less than 14°;
   wherein each of the plurality of first openings and the plurality of second openings have a portion in which a relatively long length in the second direction is relatively long and a portion in which a relative short length in the second direction is relative short, and at least either the relatively long portion or the relatively short portion has an edge which is substantially parallel to the first direction.

* * * * *